US009990866B2

(12) United States Patent
Sanchez et al.

(10) Patent No.: US 9,990,866 B2
(45) Date of Patent: Jun. 5, 2018

(54) CONTAINER TAMPER-PROOF PROTECTION BY USE OF PRINTED FIBER OPTICS MANUFACTURING AND INTEGRATED SENSORS

(71) Applicant: OpticalLock, Inc., La Mesa, CA (US)

(72) Inventors: Jorge Sanchez, Poway, CA (US); Carol E. Fuller, Santee, CA (US)

(73) Assignee: OpticalLock, Inc., La Mesa, CA (US)

( * ) Notice: Subject to any disclaimer, the term of this patent is extended or adjusted under 35 U.S.C. 154(b) by 0 days. days.

(21) Appl. No.: 15/252,045

(22) Filed: Aug. 30, 2016

(65) Prior Publication Data

US 2017/0011667 A1 Jan. 12, 2017

Related U.S. Application Data

(63) Continuation-in-part of application No. 14/976,282, filed on Dec. 21, 2015, now Pat. No. 9,618,421,
(Continued)

(51) Int. Cl.
*G08B 13/18* (2006.01)
*G09F 3/03* (2006.01)
(Continued)

(52) U.S. Cl.
CPC .............. *G09F 3/0376* (2013.01); *A61J 1/03* (2013.01); *B65D 50/00* (2013.01); *G01D 5/268* (2013.01);
(Continued)

(58) Field of Classification Search
None
See application file for complete search history.

(56) References Cited

U.S. PATENT DOCUMENTS 3,854,792 A 12/1974 Koelle
4,447,123 A 5/1984 Page et al.
(Continued)

OTHER PUBLICATIONS

Wolfer et al., "Flexographic and inkjet printing of polymer optical waveguides for fully integrated sensor systems", Procedia Technology 15 ( 2014 ) 521-529. Sep. 12, 2014.*
(Continued)

*Primary Examiner* — Charlie Y Peng
(74) *Attorney, Agent, or Firm* — Knobbe Martens Olson & Bear LLP

(57) ABSTRACT

The disclosed embodiments provide a method for tamper-proof protection of containers used for shipment of goods. An optical fiber is embedded in an Optical Shield Wallpaper which lines all interior surfaces of any size of a shipping container, package, box, barrel or other shaped container. Wallpaper is manufactured using large scale rollers that press fibers with encapsulated adhesives onto an appropriate medium. Small medicine containers are protected with a fiber optic shield and sensors manufactured using ink jet printing techniques. Light is applied to the optical fiber and a measurement of optical fiber characteristics is performed. Digital signal processing is used to generate pedigree information, which may include items such as shipping location, serial numbers and lot numbers for the goods. The status of the autonomous anti-tampering system is monitored real-time for unauthorized intrusions. Intrusions detected are relayed to an authorized recipient via a variety of communication channels.

14 Claims, 10 Drawing Sheets

Related U.S. Application Data which is a continuation of application No. 14/178,724, filed on Feb. 12, 2014, now Pat. No. 9,329,098.

(60) Provisional application No. 62/211,816, filed on Aug. 30, 2015, provisional application No. 61/860,733, filed on Jul. 31, 2013.

(51) Int. Cl.
| | | |
|---|---|---|
| *A61J 1/03* | (2006.01) | |
| *B65D 50/00* | (2006.01) | |
| *G01D 5/26* | (2006.01) | |
| *G01M 11/08* | (2006.01) | |
| *G01M 11/00* | (2006.01) | |
| *G08B 13/12* | (2006.01) | |
| *G09F 3/02* | (2006.01) | |

(52) U.S. Cl.
CPC .......... *G01M 11/088* (2013.01); *G01M 11/31* (2013.01); *G08B 13/126* (2013.01); *G09F 3/0329* (2013.01); *G09F 2003/0273* (2013.01)

(56) References Cited

U.S. PATENT DOCUMENTS

| | | |
|---|---|---|
| 4,688,891 A | 8/1987 | Carratt et al. |
| 5,104,391 A | 4/1992 | Ingle et al. |
| 5,499,017 A | 3/1996 | Beigel |
| 5,592,149 A | 1/1997 | Alizi |
| 5,613,388 A | 3/1997 | Murphree |
| RE37,011 E | 1/2001 | Dawson et al. |
| 6,304,713 B1 | 10/2001 | Isogai et al. |
| 6,420,971 B1 | 6/2002 | Leck et al. |
| 7,410,103 B2 * | 8/2008 | Nagel ................. G06K 7/0008 235/440 |
| 7,471,203 B2 | 12/2008 | Worthy et al. |
| 7,482,924 B1 | 1/2009 | Beinhocker |
| 7,608,812 B2 * | 10/2009 | Beinhocker .......... G08B 13/126 250/227.14 |
| 7,696,471 B2 * | 4/2010 | Ogisu ................ G01D 5/35303 250/227.14 |
| 8,982,360 B2 | 3/2015 | Zhao et al. |
| 2003/0151492 A1 | 8/2003 | Renfroe |
| 2005/0093814 A1 * | 5/2005 | Kuo ........................ G02B 6/06 345/102 |
| 2006/0083458 A1 | 4/2006 | Iffergan |
| 2007/0120381 A1 | 5/2007 | Ehrensvard et al. |
| 2010/0014071 A1 | 1/2010 | Hartog |
| 2013/0055773 A1 | 3/2013 | Li |
| 2015/0017402 A1 | 1/2015 | Suzuki et al. |
| 2015/0226637 A1 | 8/2015 | Sanchez et al. |
| 2015/0352861 A1 * | 12/2015 | Yagi ....................... B41F 17/10 347/85 |

OTHER PUBLICATIONS

International Search Report dated Dec. 15, 2016 in related International Application No. PCT/US2016/049489, filed Aug. 30, 2016.
Abus, "Container Lock Granit 215/100, More Security for Containers" ABUS Security Tech Germany, Jan. 2009 (Jan. 2009), p. 1-2.
Swedberg, "TrakLok Offers Hybrid System for Tracking Containers" RFID Journal Jun. 3, 2011 (Jun. 3, 2011, entire document [online] URL=http://www.rfidjournal.com/articles/view?8504>.
International Search Report and Written Opinion dated Mar. 27, 2017 in related International Application No. PCT/US2016/060828, filed Nov. 7, 2016.

* cited by examiner

CONTAINER TAMPER-PROOF PROTECTION BY USE OF PRINTED FIBER OPTICS MANUFACTURING AND INTEGRATED SENSORS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The presently disclosed embodiments and manufacturing processes relate to the prevention of tampering with a container of products to prevent substituting counterfeit products in the container, prevent theft and unauthorized access in general.

Description of the Related Technology

Shipping containers used for sea and land transport of goods are especially vulnerable to intrusion when left in a holding yard such as at a freight forwarder. Containers can be compromised when illegally removed from holding yards or high-jacked while in transit. An emerging issue noted especially by military shippers is a breach of a shipping container through its walls rather than through the container doors. Once a wall—breach occurs, the intruders can replace and repair the hole to make the container appear untouched. Detection of the breach becomes problematic for the shipper and the recipient of the goods until the time the contents are carefully examined. Often the time between a breach and examination can be lengthy, making it impossible to recover the lost goods and track down the intruders.

Globalization of product manufacturing has brought a significant challenge to consumers in that many products are substituted by counterfeits during and after manufacture, throughout portions of the supply chain and during transit. These counterfeit products do not perform as intended causing significant financial losses, jeopardizing national security and endangering the health of individuals. Counterfeiters attack the supply chain for electronic parts, costly mechanical parts, expensive perfumes and cosmetics, and medicines and more. Some of the worst examples include counterfeit medicines, which can be substituted with chemicals with life threatening consequences; bolts which go into critical locations such as bridges and aircraft; fire extinguishers containing compressed air which cannot perform in urgent situations; and electronic parts that are installed in national Defense systems which reduce reliability and performance, further causing life threatening situations.

Present solutions include the utilization of Radio Frequency Identification (RFID) tags. These tags are devices that are attached to the products or shipping container. They include an identification code and in some cases manufacturing information about the part. During shipment and at different locations of the supply chain, the RFID tags are scanned by equipment that applies radio frequencies to the tag and reads the identity of the part to determine if the tag will return the correct information. If this is the case, then the product is believed to be authentic.

Shipping and logistic services suppliers are able to check the part in transit at various locations to determine if the RFID tag returns the expected information.

However, the use of RFID tags has significant weaknesses. When used in a box or package containing products it only ensures the box or package that carries the authenticity tag to be good. The box or package contents can be counterfeit and could have been changed somewhere in the supply chain during transit, at a warehouse, or in the vehicle during transportation between supply chain locations.

If the RFID tag is used to tag individual items, a known approach is to remove the tag and place the tag on a counterfeit item, then selling the authentic part to another customer, resulting in increased profits to the counterfeiter. There are companies that sell "tamper-proof" tags, however, counterfeiters will use patient and meticulous chemical procedures to dissolve the adhesive on the tag in the same manner they use processes to re-label and polish semiconductor packages. Placement of a tag on each individual product has the added disadvantage of increasing cost. For example, if added to each bolt in a shipment it will add tens of cents to the cost of the bolt. It would be costly and impractical to add RFID tags to each integrated circuit, which are put in the customary shipping tubes. Further, the tag would interfere with the automatic insertion process machines used to build electronic assemblies. Furthermore, a tag cannot be added to many of the miniature electronic devices such as resistors, capacitors, and many increasingly smaller integrated circuit packages, which are much smaller than an RFID tag. For example, the dimensions of a 01005 resistor is only 0.4 mm by 0.2 mm; placing a tag on one of these devices is not physically nor economically feasible. Critical mechanical parts have had tags inserted in the part itself. This approach will also be subject for tag removal or hacking of the tag code, and will only be successful using the more complex tags with a read block. In this last case there will be a significant cost increase and the addition of the tag embedded in the part can affect its performance.

In addition to the limitations described above, RFID tags can be hacked where the part information can be read and placed in another fresh tag which can then be attached to counterfeit product. RFID tags vary in price from 10 cents to several dollars each. Some of them have a "read block" feature in place meant to prevent tampering, however, this feature requires a State Machine or a processor function to be placed in the tag, therefore only the more costly tags will have the feature. The read block tags will individually be placed in the more costly products, but they will still be subject to the issues previously described.

Attempts have been made to include tags made out of paper used to seal the package, plastic wrap, or molten metal devices embodying wires at both sides of container lids. However, these sealing methods only present a temporary challenge to counterfeits, who, with enough effort in a workshop and with minimal equipment can replace products with counterfeits in containers, reproduce the seals and reattach RFID tags. If tags are not write-read-write protected internally, they can be readily counterfeited.

There are approaches used by the prior art where a shipping container holding parts is irradiated with electromagnetic signals of varying frequencies and a signature is obtained, which is then compared to a similar measurement made at the receiving location. Alternatively a prior electromagnetic measurement characterization is made of a typical system and used as the standard for authenticity. Depending on the signature reflected by the materials in the container, an assessment is made about the authenticity of the parts. Electromagnetic radiation is subject to substantial reflections from the surrounding environment, the parts in the shipping container, and the physical position of the test equipment. These reflections will distort the measurement, and add noise to the reflected radiation, which will affect repeatability and reliability of the measurement. Results are often influenced by the skill level of the test operator and their ability to interpret the test equipment results.

There are other approaches that use a tool to radiate light into the package under test. This is used to detect counterfeit medicines. When the light is reflected, the tool is able to detect the presence of a few known chemicals, due to effects such as fluorescence characteristics. If these chemicals reflect light that corresponds to a different chemical to what is known to be contained in the medicine, the package is thought to be a counterfeit. Comparison and evaluation of the detected light is subjective in that the color on the display of the test tool is not a clear-cut choice and is subject to interpretation errors.

The market for medicines deserves special mention since the consequences of counterfeits are life threatening and potentially epidemic in scale. Over-the-counter medicines are placed in containers having a cap sealed with a plastic wrap that is tightly shrunk around the cap. This cap can be reproduced and containers with medicines can be replaced with counterfeits. Large shipments of medicines shipped in bulk to pharmacists can be shipped with RFID tags, but have the issues previously described above.

Reliance on the use of RFID tags only as a means to prevent counterfeit parts, means there must be extensive inspection of all components of any particular shipment, which increases the cost of counterfeit parts detection. This cost in turn is passed onto the end consumer.

SUMMARY OF CERTAIN INVENTIVE ASPECTS

Embodiments disclosed herein address the above-stated needs to protect consumers from counterfeit parts and protecting goods during shipment by showing a method and apparatus designed for that protection.

The described technology relates to an arrangement of an optical fiber(s) that covers the six sides of the interior of a container, which include the bottom, the top, the two sides, and end walls.

An objective of the described technology is to embed optical fibers in media using specialized manufacturing techniques such as large scale rollers and in addition to embed fibers and sensors in media with the use of ink jet printing techniques. These approaches enable the solutions to be sufficiently low in cost so that they can be readily adopted by the market and used for any sized and shaped shipping container. Optical fiber is embedded in a medium such as non-woven fabric, paper, cardboard, wood products, plastic sheets or other conformable, flexible media. The resulting combination of the continuous web of optical fibers that, along with the confirmable media, blankets all of the container interior walls. The arrangement of the described technology forms what is known as an Optical Shield Wallpaper.

The Optical Shield Wallpaper utilizes properties in optical fibers, which upon a parametric light wave measurement provides a characteristic profile that is unique to a particular fiber and fiber physical arrangement. This characteristic profile accounts for the fiber's bends, cracks, transmission modes, chromatic dispersion and other effects is known as the Optical Signature. For example, the parametric measurements may include time related measurement of light transmission, wavelength related measurement of light transmission, modulation of wavelength of light, modulation of amplitude for a single wavelength or multiple wavelengths, and/or polarization of light. It should be noted that any other characteristic response property of an optical fiber could be used to meet the objectives of the described technology.

The parametric information is revealed upon the application of laser light from an external laser source or other suitable light source. The parametric measurement can be done at the product manufacturing facility, at the consumer location, or in a real-time manner with an embedded laser system.

A proprietary digital signal processing program selects various portions of the parametric measurement characteristics, in a predetermined or random manner, implements a mathematical algorithm to transform the measurement characteristics, and then encodes the information for security purposes. The encoded information produced by the mathematical algorithm is known as the Identity Code. The Identity Code is a unique identification of characteristics embedded in the fiber and is an encrypted, randomized subset of the information found in the Optical Signature.

The Identity Code along with the part number, date of manufacture, serial number, manufacturing location, part name, lot number, manufacturing line, test station, and physical characteristics constitute what is known as the Pedigree information.

The Optical Shield wallpaper uses various parametric measurements that affect the light transmission properties of optical fibers. For example, if an optical fiber is deliberately cracked in various areas, the cracks will cause any travelling light in the fiber to reflect back to the light source at time intervals, which are dependent on the location of the crack along the fiber. Another property of the fiber is known as dispersion, which causes any laser pulses injected into one end of the fiber to broaden in time before they reach the opposite end. When laser light is injected at one end of the fiber it is detected at the opposite end of the fiber. The specific wave-shape of the pulse received at the end of the fiber becomes one of the elements used to generate a unique Optical Signature. A third property of the fiber is experienced when the optical fiber creates distortions including additional wavelength characteristics if the fiber is bent in any particular way. This creates a specific profile of laser light that can be observed with an optical spectrum analyzer. Additional properties of light transmission in an optical fiber such as light polarization, backscatter reflections such as Rayleigh, Brillouin or Raman can be used to produce the necessary parameters used to obtain a unique Optical Signature. One or more transmission characteristics from the Optical Signature of the fiber similar to, but not limited to, the prior examples can be selected by the proprietary digital signal processing program to generate the Identity Code. After the Code is initially generated at the manufacturing facility, the Code is embedded in the Pedigree and then sent on a secure Internet channel to the consumer and/or embedded in the RFID tag. Any tampering of a package or a breach of the container wall will affect the Identity Code, and upon making a measurement, the consumer can compare the Code received to the Code measured and any difference exceeding a given threshold will reveal that intrusion has occurred, thus making the shipment suspect. Whether monitored real-time or on an event-driven basis, the Optical Shield Wallpaper installed on a container's walls will detect a breach, and notification of a breach of the container can be immediately sent to a designated recipient. Immediate notification of a container breach enables rapid response by appropriate authorities who can potentially prevent or interrupt an unauthorized intrusion.

Accordingly, in one aspect of the described technology, a method of protection and detection of counterfeits for products involves taking a parametric measurement of an Optical Shield embedded in a package or surrounding the product or blanketing the interior walls of any container. The measurement is taken at the product manufacturing facility and an Identity Code is obtained. The Identity Code is encrypted and embedded in a Pedigree. The Pedigree is sent to a customer specified location in the supply chain over a secure communications channel. The receiver of the shipment of goods takes a similar measurement and verifies that the Identity Code is the same, which provides confidence that no tampering has occurred.

The Optical Shield Wallpaper in the described technology utilizes different types of response properties of optical fibers. Depending upon which type of light source is applied to the fiber under test, for example, an LED light source, or a laser light source (fixed wavelength or tunable wavelength), an amplitude modulated light source, a light source whose wavelength is modulated, or other appropriate light source, the response properties obtained upon a measurement will be different. Response properties can be, for example: time related measurement of light transmission, wavelength related measurement of light transmission, modulation of frequencies of light, modulation of amplitude of a single wavelength or multiple wavelengths, and/or polarization of light. It should be noted that any other characteristic response property of an optical fiber could be used to meet the objectives of the described technology.

In another aspect, an article of manufacture for the protection of products from counterfeits is disclosed. Hereafter this will be known as the Article. The Article includes optical fiber as a continuous web embedded in a medium such as non-woven fabric, paper, cardboard, wood products, plastic sheets or other conformable, flexible media. The resulting combination is known as Optical Shield Wallpaper. The Optical Shield Wallpaper is used to line the walls of a container or package to cover all six sides. The beginning and end of the continuous fiber connects to an intelligent, autonomous detection unit called an iLockBox.

The iLockBox includes all of the necessary hardware and software required to monitor and report on the status of the wallpaper integrity. Some of the functional elements in the iLockBox include but not limited to: GPS; RFID; battery; optical transceiver; communication channels for Internet, satellite, Bluetooth, and mobile; software, algorithm, and firmware for signal processing and encryption of communications.

BRIEF DESCRIPTION OF THE DRAWINGS

The nature, objects, and advantages of the described technology will become more apparent after considering the following detailed description in connection with the accompanying drawings, in which like reference numerals designate like parts throughout, and wherein.

DETAILED DESCRIPTION OF CERTAIN INVENTIVE EMBODIMENTS

The word "exemplary" is used exclusively herein to mean "serving as an example, instance, or illustration." The embodiment described herein as "exemplary" is not necessarily to be construed as preferred or advantageous over other embodiments.

The disclosed embodiments provide a process for tamper proof security of a shipping container of any size or configuration. A package with an optical fiber and a process including a test system and digital signal processing software allows a shipping container to be protected on all sides. Although illustrations and discussions are directed to a shipping container, similar approaches will apply for other containers such as with a semi-truck, fixed storage container, train cars, secure warehouse or other type or storage that needs to be protected against unauthorized access or tampering.

Figure 1:
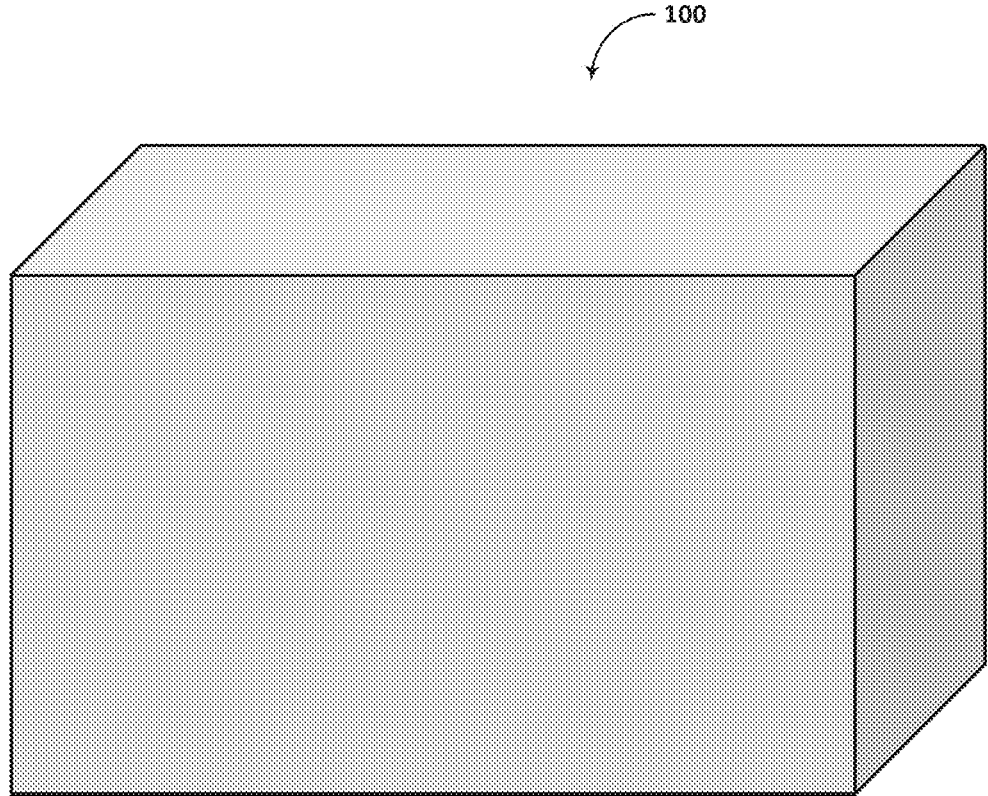
FIG. 1 shows a typical shipping container used to transport goods over air, sea and land.

FIG. 1 illustrates a typical shipping container 100, showing that it has six sides that need to be protected, any of which are vulnerable to unwanted intrusion. A container as described herein can be any size or shape, and moved by any of the typical shipping methods used today, which is by air, land or sea.

Figure 2:
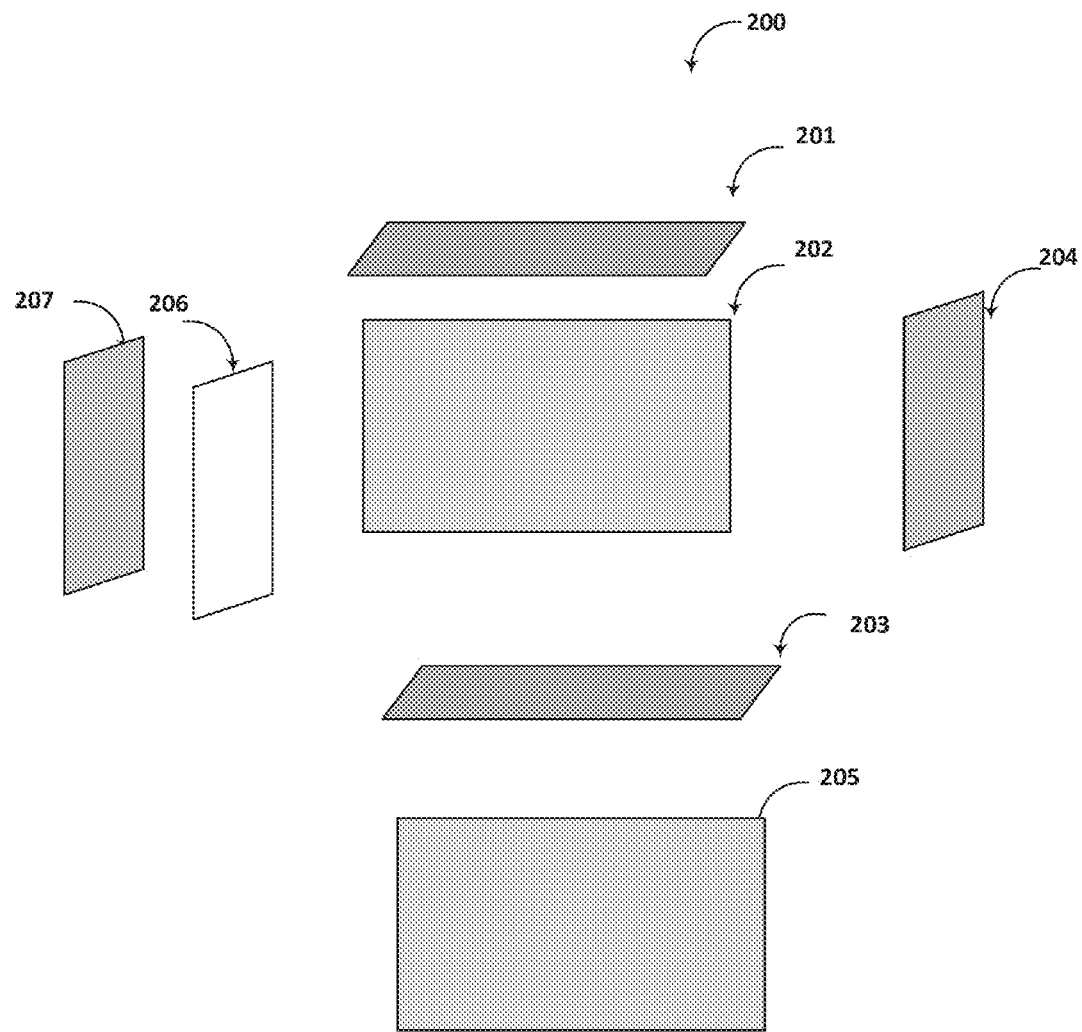
FIG. 2 shows a breakdown of the different sides of a typical shipping container used to transport goods over air, sea and land.

In FIG. 2, is a breakdown of all of the sides of a shipping container 200. The sides are the top side 201, the bottom side 203, the left side 202, the right side 205, the back side 204 and the front 207. 206 represents an overlapping flap where additional Optical Shield Wallpaper is placed in order to protect the entrance to the container.

Figure 3A:
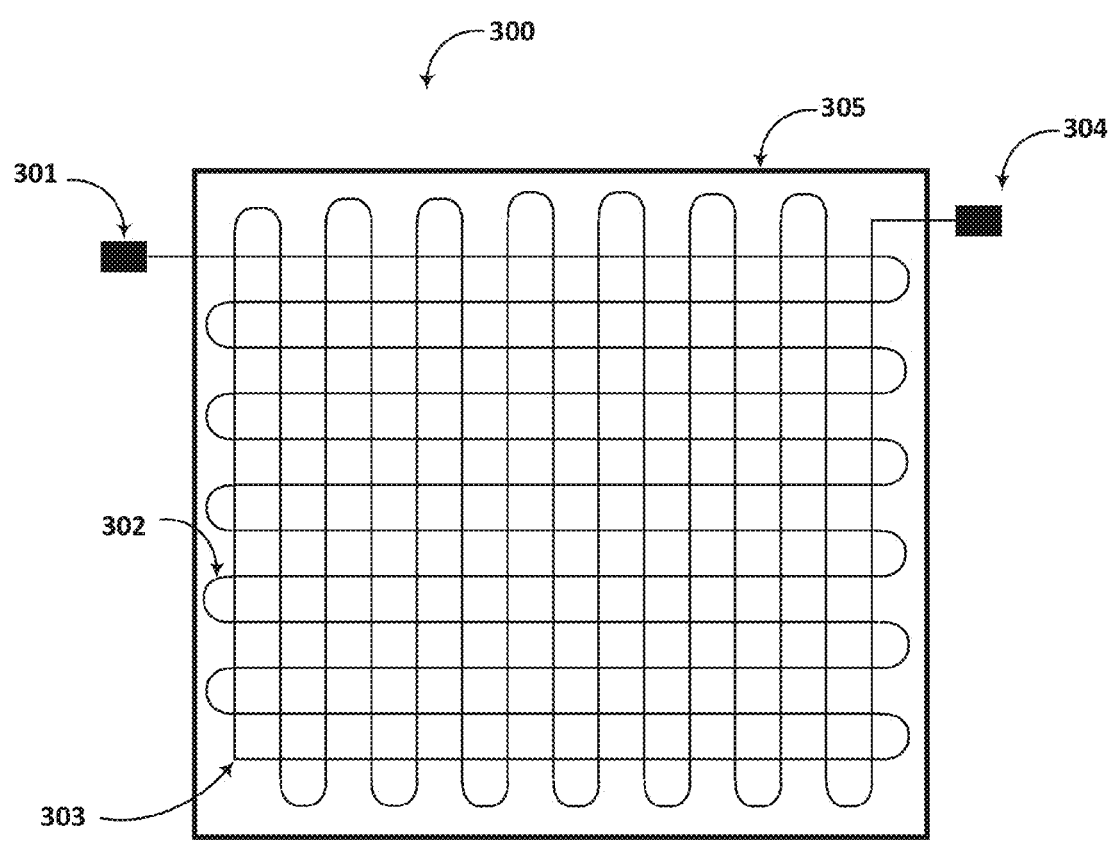
FIG. 3a shows an embodiment of how the Optical Shield Wallpaper can be constructed.

FIG. 3a, 300 shows an illustration of how an Optical Shield Wallpaper 300 is made and which is used to protect the container. The Optical Shield Wallpaper includes a flexible conformable media 305, over which a suitable optical fiber 303 may be applied or embedded and fixed in place. The material can be paper, plastic, cloth, nonwoven material, wood product or any other conformable material that can accept the optical fiber. The optical fiber can be glued to the backing material, can be embedded into the material when it is manufactured, or alternatively it is possible to place the fiber between two layers of the backing material as in a sandwich arrangement. The optical fiber 302 is routed in a way to form a grid which can be rectilinear or any manner of random arrangement such that it does not allow penetration of a person, hands or arms or tools or the removal of goods from the container without disrupting the optical fiber arrangement. In FIG. 3, it shows one possible arrangement for the optical fiber where it is first routed in a horizontal pattern and then shows in 303 it is routed in a vertical pattern. The beginning of the fiber is connected to an input fiber optic connector 301 and the end of the fiber is connected to an output fiber optic connector 304. The fiber optic connectors can meet different standards such as FC, SC, SMA, or some other configuration or standard, or can be a customized connector. The Optical Shield Wallpaper may include a layer of adhesive to facilitate binding the Optical Shield Wallpaper to the sides of the container.

Figure 3B:
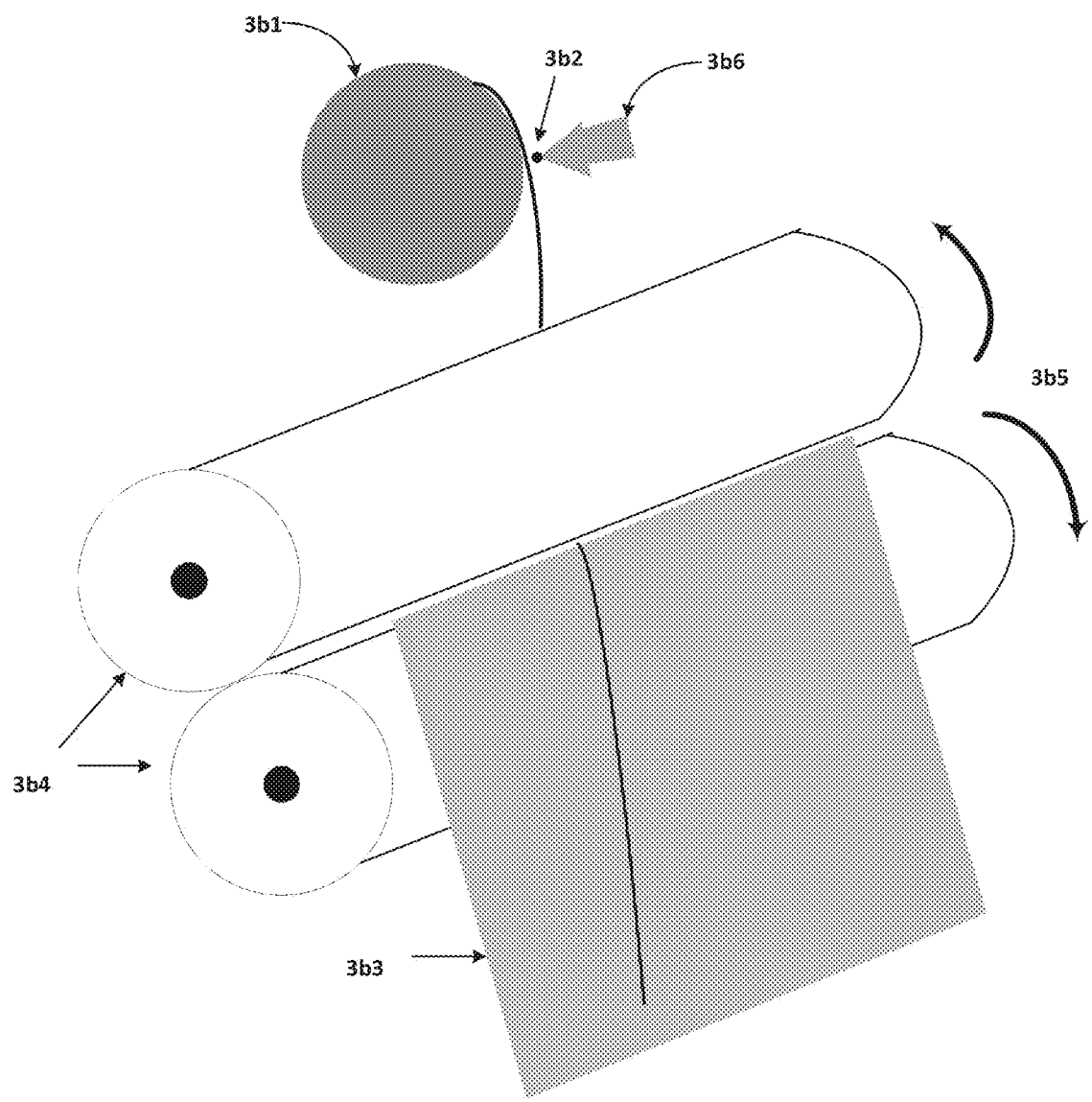
FIG. 3b shows a typical large scale manufacturing process for the Optical Shield Wallpaper.

FIG. 3b shows a possible manufacturing process for the Optical Shield Wallpaper. 3b1 is a roll including optical fiber which is pretreated with an adhesive 3b2 which is applied by means of an adhesive print system 3b6. The optical fiber is then applied to a media or substrate 3b3. The adhesive 3b2 can be an encapsulate or other commercially available pressure-sensitive adhesive. Activation of the encapsulate or pressure-sensitive adhesive 3b2 is done with a pair of high pressure rollers 3b4 rotating as shown by arrows 3b5. The high pressure of the rollers forces the fiber onto the media 3b3 and activates the adhesive 3b2 on the fiber thus attaching it to an appropriate media or substrate 3b3. In the case where the pressure-sensitive adhesive 3b2 or encapsulate 3b2 is temperature activated, the rollers 3b4 can be heated.

Figure 4:
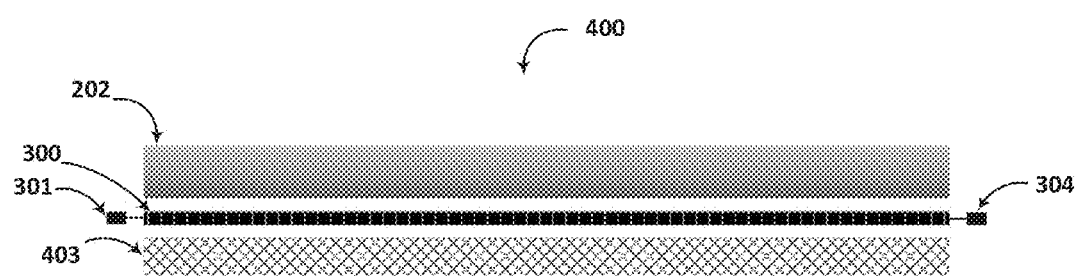
FIG. 4 is an embodiment of the Optical Shield Wallpaper as applied to one surface of a container.

FIG. 4, 400 illustrates how the Optical Shield Wallpaper can be applied to one of the six sides of the container to form a panel. In this case we show an example of how to apply the Optical Shield Wallpaper to the left side 202 of the container. The Optical Shield Wallpaper 300 is applied to the wall of the container by using attachment pins or by using adhesive to apply it like standard wallpaper on a wall. The Optical Shield Wallpaper can be protected from damage by an additional protection layer of material 403 which can be made out of wood, plastic, metal or some other protective material and attached to the side wall 202 of the container. Various other configurations of the Optical Shield Wallpaper, how it's applied to the side wall of the container, the density of grid, and other arrangements can be utilized in order to implement the described technology. Connectors 301 and 304 will be available to connect the panel with the Optical Shield Wallpaper to additional panels to provide complete wall coverage.

Figure 5A:
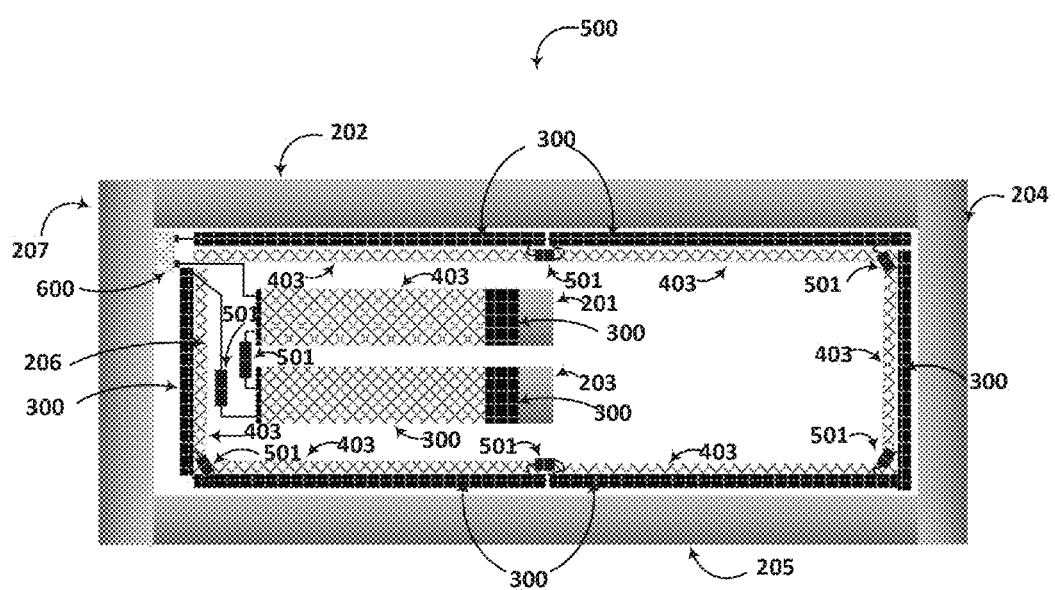
FIG. 5a shows how different Optical Shield Wallpaper panels can be applied to all interior surfaces of a container.

FIG. 5a, 500 illustrates the arrangement used to protect the sides 202, 204, 205, and 207, the top 201, and the bottom 203 of a container to prevent tampering. A portion of the top 201 and the bottom 203 with their Optical Shield Wallpaper 300 and their respective protection layer or material 403 are shown for illustration purposes. Several panels of The Optical Shield Wallpaper are shown attached to the mentioned sides of the container. In this case there are six Optical Shield Wallpaper panels 300. The fiber in each of the panels is connected to the adjacent panel as shown in connection points 501 using connectors 301 at the beginning of the fiber and connectors 304 at the end of the fiber corresponding to each Optical Shield Wallpaper 300. As shown in the illustration, the optical fiber in the Optical Shield Wallpaper panel forms a continuous circuit so an optical signal is sent into connector 301 of a given panel will circulate through the fiber and an output signal will come out of connector 304. In the same manner, using connectors 301 and 304 Optical Shield Wallpaper panels can be attached to the top 201 and on the bottom 203 of the container. This arrangement will thus form a complete continuous loop of optical fiber in an arrangement that will cover the six interior walls of the container. Note that the Optical Shield Wallpaper panels can be overlapped so that there are no gaps in the coverage of the sides of the container. The Optical Shield Wallpaper protection arrangement on the front side 207 shows the addition of an overlapping flap 206 used to protect the door of a container (or a cover, or an entrance to the container). The overlapping flap 206 can be made of a similar material as the protective layer 403. In this case the Optical Shield Wallpaper 300 can be adhered to the overlapping flap 206. The entire loop of fiber covering all six sides terminates in two connectors which are attached to the iLockBox 600, or a detection device, which is described in detail in FIG. 6. Once the iLockBox is connected to connectors 301, 304 for the beginning and the end of the fiber loop respectively, the ends of the container 207 can be closed and the container will be secured.

Figure 5B:
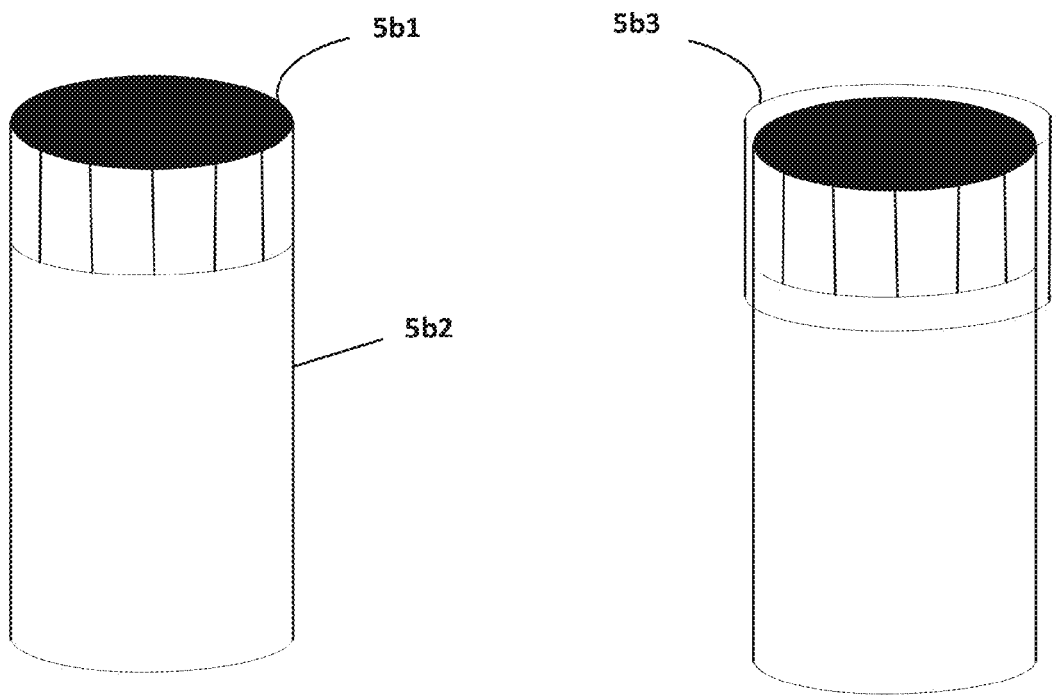
FIG. 5b shows the application of an optical shield protection to a small container with medicines using ink jet printing manufacturing

FIG. 5b shows an embodiment of the technology as it is applied to a small container with medicines or other valuable material. The medicine container may be, for example, a common plastic container used to package tablets, capsules, powders and liquids. In one embodiment, the container cap 5b1 is a plastic cap that closes the container bottle 5b2. In various embodiments, the optical fiber shield is made of a shrink wrap material in a cylindrical shape 5b3 that is the carrier of an optical fiber that conforms the optical fiber shield to a junction of the container bottle 5b2 and the container cap 5b1. Furthermore, light sensors, which can detect light that is transmitted through the optical fiber, can be inkjet printed along with the optical fiber. In another embodiment, the optical fiber shield is placed on the carrier 5b3 using an ink jet printing manufacturing technique which also allows the placement of appropriate sensors along the length of the optical fiber shield or optical fiber. When the sensors are located in this way, the location of the breach can be narrowed down to a particular region of the container such that the breach is easier to find.

For example, in one embodiment, the carrier 5b3 has three sensors, first to third sensors, that are formed along the length of the optical fiber. And in this example, a breach occurred between the first and second sensors. In this example, the first sensor is located closest to an end of the optical fiber from where light transmitted (e.g., a light source) and the third sensor is farthest from that end. When light is transmitted through the optical fiber, the first sensor does not detect any abnormality of the optical fiber, since there is no breach between the light source and the first sensor. However, when the second sensor senses the light, the breach will be detected, since the breach would have altered the physical characteristic of the optical fiber between the first and second sensors. Thus, a user will be able to detect the location of the breach easier by having multiple sensors that are placed along the length of the optical fiber. Furthermore, optoelectronic devices such as fiber gratings, LEDs or other types of optical devices can be incorporated into the fiber.

Sensors also allow the possibility to further implant in the carrier additional unique identifiers for the container. To guarantee lack of tampering with the medicine container, the optical fiber shield can use similar fiber optic signatures discussed earlier which are also used by the Optical Shield Wallpaper. Information about the ink jet manufacturing technique used in this embodiment can be seen in the article Micro-Optics Fabrication by Ink Jet Printing and can be downloaded from the web at: http://microfab.com/images/papers/opn-oj-magarticle.pdf.

Figure 6:
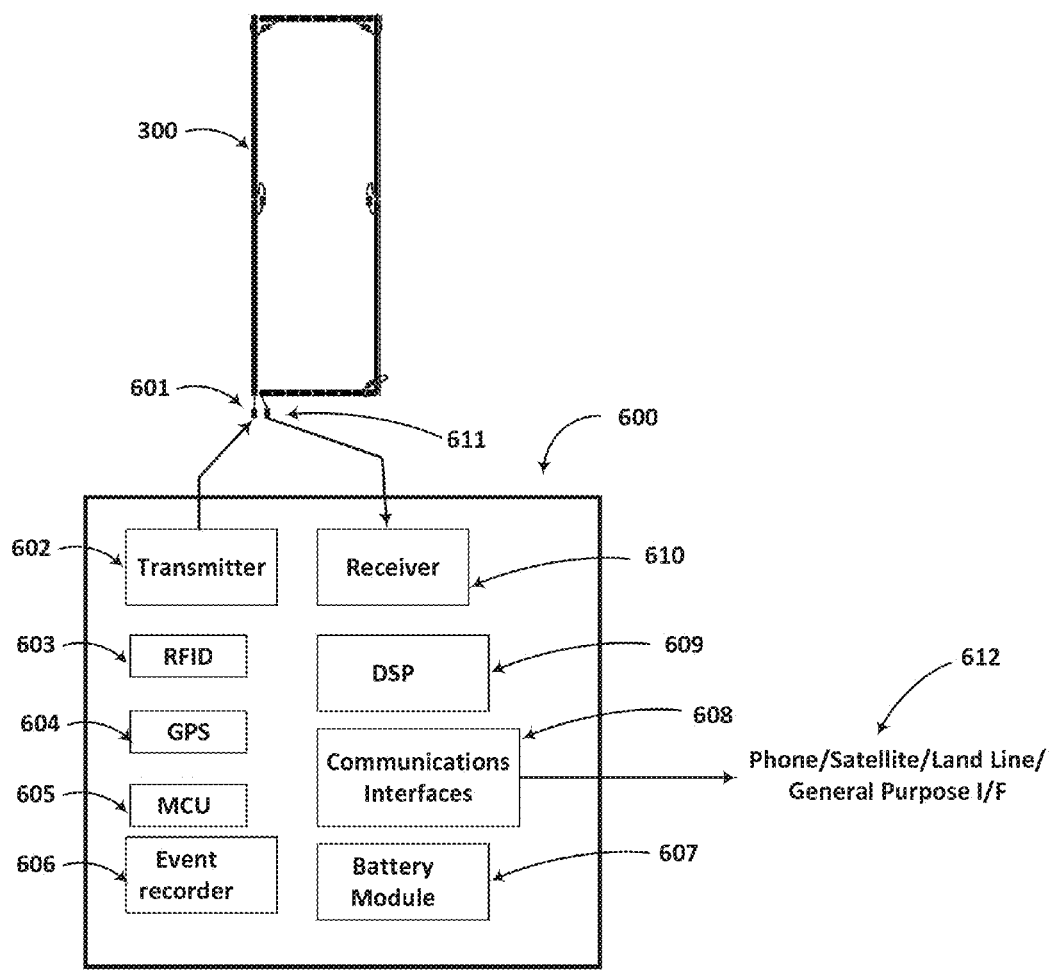
FIG. 6 illustrates how the continuous web of Optical Shield Wallpaper connects to the iLockBox.

FIG. 6, 600 shows an embodiment of the iLockBox used to activate the Optical Shield Wallpaper which can notify shippers and owners of the goods, about potential intrusions. In this case we only show a top view of the sides of the container 500 as was done in FIG. 5 with the understanding that the top 201 and bottom 203 of the container are also covered with the Optical Shield Wallpaper. Note that in this illustration the iLockBox is not drawn to scale relative to the sides of the container. This was done to illustrate the details and functionality of the iLockBox. The iLockBox includes the electronic and optical hardware and software used to detect intrusions into the container and to notify user of the intrusion in real time. The iLockBox connects to the Optical Shield Wallpaper surrounding the container at location 601 where transmitter 602 in the iLockBox generates an optical signal which is injected into the optical fiber of the Optical Shield Wallpaper. The optical signal in the transmitter may be from a semiconductor laser, an LED or other suitable light source. The light circulates in the optical fiber loop of the Optical Shield Wallpaper and is received at connector 611 and detected by the receiver 610. The iLockBox may include an RFID tag 603 and a GPS locator 604. The Microcontroller or processor MCU 605 includes embedded software used to manage operations and to host the control system. An event recorder 606 can be set to continuously monitoring the Optical Shield Wallpaper to ensure the loop is not affected by breaking or by changing its signature characteristic. The event recorder can also be set to periodically monitor the Optical Shield Wallpaper, or to record an event at the time the event occurs. The event recorder 606 is used to store the history of the information generated by the iLockBox 600 monitoring, its general operation and any access of the container during a given period of time. A battery module 607 powers the system during the period of time when the container is protected. Typically the period of time can be arbitrarily extended by providing a sufficient amount of battery energy stored. A Digital Signal Processor 609 is used to carry out multiple operations related to the generation of an optical signature for the Optical Shield Wallpaper as well as execution of mathematical models and statistical models. The Digital Signal Processor 609 can also be implemented in software resident in the MCU 605. Another module in the iLockBox 600 is the communications interface hardware. This is used to communicate to the user in a near or remote location the status of the container. Some of the communication interfaces 612 can be to a mobile phone via short distance wireless, to a cellular tower or an RF receiving tower, a land line, satellite, fiber optics cable and other types of communication channels. There are several methods used in the described technology used to prevent the deliberate isolation of the container for the purpose of keeping it from notifying the user that tampering is occurring. In one method the user system in a server can query the iLockBox 600 on a periodic basis to detect status. In another method a nonmetallic window such as glass in a given area of the container can be used to place a satellite antenna on the inside of the container to broadcast any tampering occurring in real time or in an event driven mode. The non-metallic window can be protected from disturbance by a panel of Optical Shield Wallpaper that in this case is made with a material that will not block RF frequencies coming out of the antenna. The antenna is therefore not prevented from transmitting at any time. Both methods can be used at the same time for greater communication and security assurance.

Figure 7:
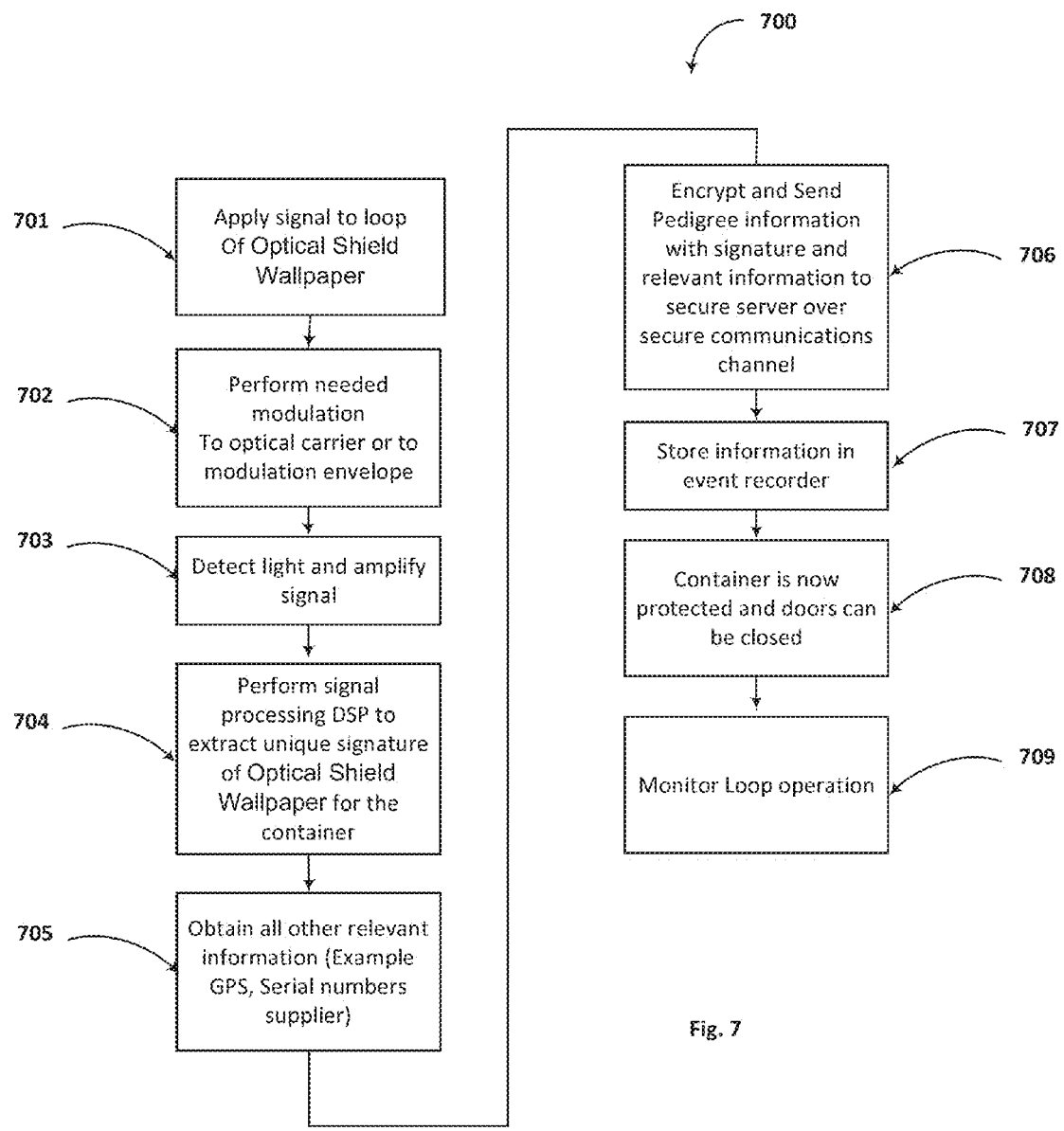
FIG. 7 is an embodiment of the process used to characterize the container secured with the Optical Shield Wallpaper using the iLockBox.

FIG. 7, 700 shows a process executed in the iLockBox 600 used to acquire a unique signature for the Optical Shield Wallpaper. In the first step 701 we apply a signal to the fiber optic loop in the Optical Shield Wallpaper. In a second step 702 we conduct a modulation of the optical carrier frequency (or wavelength) signal in the optical domain and apply a modulation signal envelope used to modulate the optical carrier. The modulation envelope may apply AM, FM or any other type of modulation. The carrier may be modulated as well by changing the wavelength of the light source. Both time and frequency modulation can be done in the electrical domain and in the optical domain one at a time or by a simultaneous time and frequency modulation. In step 703 we detect the optical signal after it circulated through the Optical Shield Wallpaper fiber loop. The optical signal is converted to and electrical signal and it is digitized. In step 704 we perform a digital signal processing algorithm to extract a unique signature. This is done by a detection of the modulation elements, by detecting signal dispersion, optical polarization, chromatic dispersion, absorption reflection or other optical effect characteristic of the fiber section we are using. Other relevant information produced by the various elements of the iLockBox 600 is collected in step 705 such as GPS location, RFID information, event recorder information, etc. The information is then encrypted and sent in step 706 to a secure server over a secure communications channel. In addition, various optical modules can be used to insert optical attenuation and distortion and can be arbitrarily used by placing them in between connection points 501 to further randomize the signature to make it unique and robust, free of efforts to counterfeit the signal. The same information sent to the secure server is stored in the event recorder in step 707. In step 708 the ends of the container can be closed. In step 709 the system goes into a mode where the loop is continuously operated and monitored, or periodically or event driven monitoring.

Figure 8:
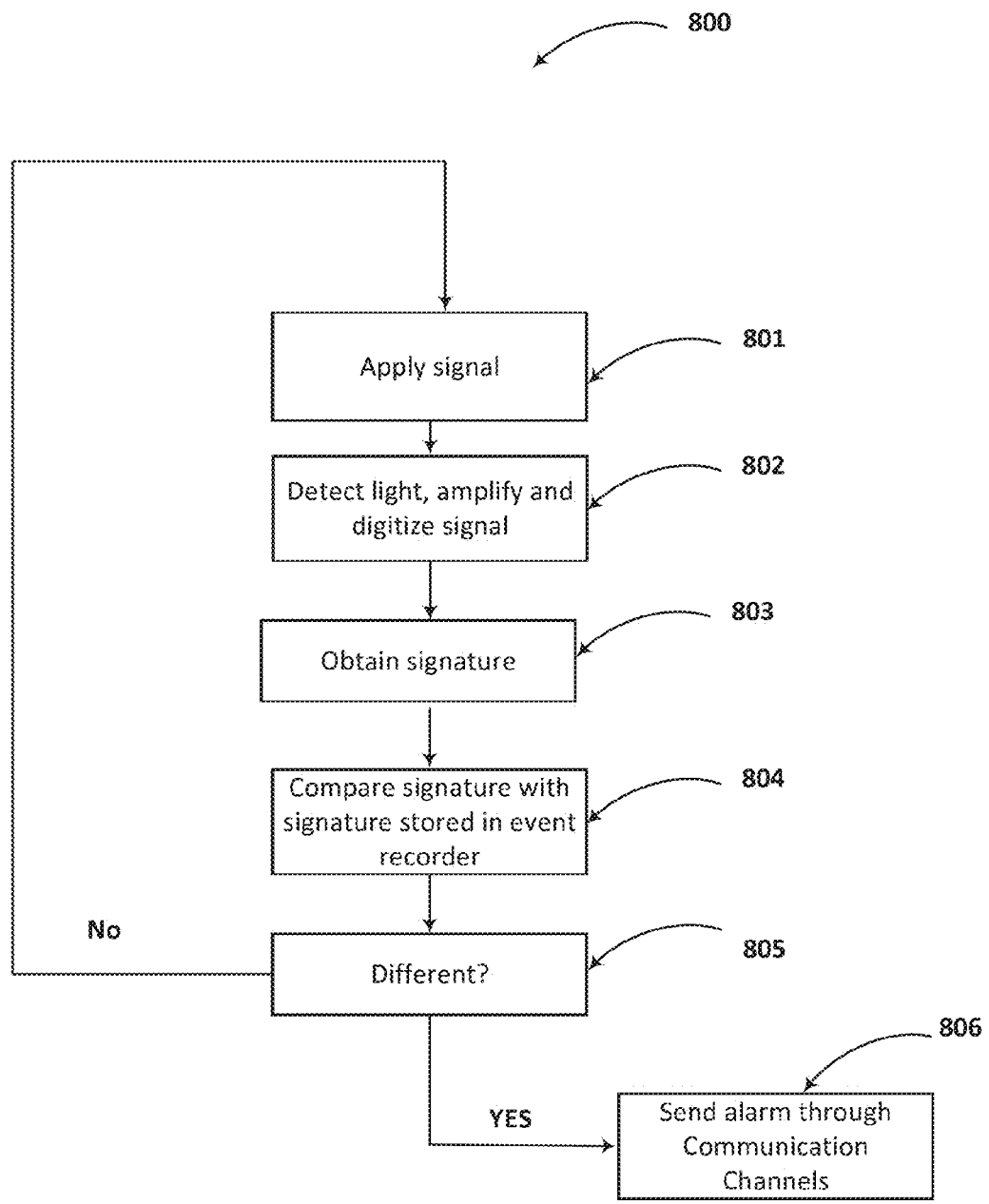
FIG. 8 illustrates the monitor loop operation process used to protect the container from intrusions

FIG. 8, 800 shows a process executed in the iLockBox 600 used to monitor the container security. In step 801 we apply an optical signal to the Optical Shield Wallpaper optical fiber loop. In step 802 we detect, amplify and digitize the optical signal coming out of the Optical Shield Wallpaper loop. In step 803 we obtain the signature of the Optical Shield Wallpaper optical fiber loop. In step 804 we compare the obtained signature with the signature obtained when the container was first closed and which was stored in the event recorder. In step 805 we determine if the signal is different or the same. If the signature comparison is the same between the two measurements, the loop is initialized again to continue the monitor mode. If the comparison is different, at 806 an alarm is sent to the server using one of the available communication channels. Note that in the described technology more than one communication channel may be used to notify sever about tampering for redundancy and to prevent an intruder from cutting off real-time communication with the server. Also the continuous monitoring loop can be adapted so it executes at a programmable intervals of time in order to save battery power. Another way to save battery power is to monitor and notify based on events, such as an intrusion, or unauthorized opening of the any of the container sides.

The ordering of steps and components illustrated in the figures above is not limiting. The methods and components are readily amended by omission or re-ordering of the steps and components illustrated without departing from the scope of the disclosed embodiments.

By this description a novel way to protect shipping containers with products inside has been described. A description of the type of light sources that can be used, packaging techniques typically used to incorporate the Optical Shield Wallpaper loop and, the algorithms used to test the fiber characteristics may all use a variety of different technologies and techniques.

The various illustrative logical measurement techniques and processes to generate a Pedigree may be implemented in a variety of combined approaches. The specifics of the apparatus used to test fiber responses used to generate the Optical Signature information can be expected to vary depending on the specific implementation of the described technology. The described functionality in varying ways for each particular application for different types of parts, systems, equipment and other shipment products, but such implementation decisions should not be interpreted as causing a departure from the scope of the present described technology.

Variation of fiber characteristics can be dependent on temperature at the measurement location, package and container deformations. The operator can adjust the fiber optic characteristic measurement thresholds to account for those effects.

The steps of a method or algorithm described in connection with the embodiments disclosed herein may be embodied directly in hardware, in a software module executed by a processor, or in a combination of the two.

An external optical lock securing the doors of a shipping container may be used to further secure the opening of the container to provide a physical security barrier that mechanical opposes the unauthorized opening of the container.

Various modifications to these embodiments, and the generic principles defined herein may be applied to other embodiments without departing from the spirit or scope of the inventive technology. Thus, the present invention is not intended to be limited to the embodiments shown herein but is to be accorded the widest scope consistent with the principles and novel features disclosed herein.

What is claimed is:

1. A system for detecting tampering of an object, comprising:
    a substrate;
    at least one waveguide that is inkjet printed on the substrate, the waveguide comprising an inkjet printable material;
    one or more sensors inkjet printed on the waveguide and configured to detect light transmitted through the waveguide, the one or more sensors comprising an inkjet printable material; and
    a detection device configured to receive a signal from the sensors and process the signal, which includes information regarding physical characteristics of the waveguide,
    wherein the detection device is further configured to encrypt the information and transmit the encrypted information to a remote server configured to identify whether object tampering has been detected.

2. The system of claim 1, wherein the sensors are attached to ends of the waveguide.

3. The system of claim 1, wherein the sensors are located along a length of the waveguide.

4. The system of claim 3, wherein the sensors are spaced apart from one another at a regular interval.

5. The system of claim 4, wherein at least one of the sensors is configured to detect light transmitted through a portion of the waveguide.

6. The system of claim 1, wherein the substrate includes shrink wrap material.

7. The system of claim 1, wherein the waveguide and substrate are located around a cap of a medicine container.

8. The system of claim 1, wherein the physical characteristics includes movement of the waveguide.

9. A method of manufacturing a waveguide for anti-tampering detection, comprising:
    printing at least one waveguide via an ink-jet printing process on a substrate;
    printing at least one sensor on the waveguide;
    coupling the at least one sensor to a detection device, the detection device configured to receive a signal from the at least one sensor, process the signal which includes information regarding physical characteristics of the waveguide, encrypt the information, and transmit the encrypted information to a remote server configured to identify whether container tampering has been detected; and
    placing the substrate including the waveguide around a container.

10. The method of claim 9, wherein at least one sensor is located at an end of the waveguide.

11. The method of claim 9, wherein at least one sensor is located along a length of the waveguide.

12. The method of claim 11, wherein at least one sensor includes a plurality of sensors that are spaced apart from one another at a regular interval.

13. The method of claim 9, wherein the container includes a cap, and wherein the placing of the waveguide includes placing the waveguide and the attached sensor around the cap.

14. The method of claim 13, wherein the container contains medicine.

* * * * *